(12) United States Patent
Mizukoshi et al.

(10) Patent No.: US 6,714,796 B1
(45) Date of Patent: Mar. 30, 2004

(54) MOBILE COMMUNICATION TERMINAL DEVICE

(75) Inventors: Ryuji Mizukoshi, Tokyo (JP); Ken Amemoto, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 613 days.

(21) Appl. No.: 09/706,208

(22) Filed: Nov. 3, 2000

(30) Foreign Application Priority Data

Nov. 5, 1999 (JP) .......................................... 11-315386

(51) Int. Cl.[7] ................................................ H04B 1/38
(52) U.S. Cl. ................. 455/550; 455/552.1; 455/553.1; 455/414.4; 375/350; 708/313
(58) Field of Search .......................... 455/582.1, 553.1, 455/550, 414.1, 414.2, 414.4, 74; 375/350, 216, 217; 708/313; 381/2

(56) References Cited

U.S. PATENT DOCUMENTS

| 4,864,526 | A | | 9/1989 | Dyer | |
|---|---|---|---|---|---|
| 5,243,640 | A | * | 9/1993 | Hadley et al. | 455/426.1 |
| 5,592,165 | A | | 1/1997 | Jackson et al. | |
| 5,821,892 | A | * | 10/1998 | Smith | 341/150 |
| 5,978,689 | A | * | 11/1999 | Tuoriniemi et al. | 455/569.1 |
| 6,016,114 | A | | 1/2000 | Liu et al. | |
| 6,154,649 | A | * | 11/2000 | Reichstein | 455/426.1 |
| 6,229,990 | B1 | * | 5/2001 | Toshida | 455/69 |
| 6,230,030 | B1 | * | 5/2001 | Lu | 455/569.2 |
| 6,272,116 | B1 | * | 8/2001 | Kurihara | 370/311 |
| 6,279,019 | B1 | * | 8/2001 | Oh et al. | 708/300 |
| 6,316,711 | B2 | * | 11/2001 | Matsuda et al. | 84/615 |
| 6,377,825 | B1 | * | 4/2002 | Kennedy et al. | 455/569.2 |
| 6,476,745 | B1 | * | 11/2002 | Evans et al. | 341/139 |
| 6,519,475 | B1 | * | 2/2003 | Kim | 455/557 |
| 6,563,869 | B1 | * | 5/2003 | Yamada | 375/232 |
| 6,594,366 | B1 | * | 7/2003 | Adams | 381/74 |

FOREIGN PATENT DOCUMENTS

| GB | 2378845 A | * | 2/2003 |
|---|---|---|---|
| JP | 05-218801 | | 8/1993 |
| JP | 08-330957 | | 12/1996 |

* cited by examiner

Primary Examiner—Nay Maung
Assistant Examiner—Sujatha Sharma
(74) Attorney, Agent, or Firm—Pearne & Gordon LLP

(57) ABSTRACT

A mobile communication terminal device comprises: an A/D converter 101 for converting a transmitting analog signal into a transmitting digital signal, a digital filter 109 for applying a decimation process to a first output of a multiplexer 111 to send out to an outside if the first output is an output of the A/D converter 101 and for applying an interpolation process to a second output of a multiplexer 112 if the first output is an R-ch audio digital signal whereby the first output and the second output can be processed on time-division basis, a D/A converter 104 for converting the R-ch audio digital signal which is subjected to the interpolation process by the digital filter 109 into an analog signal, and a D/A converter 103 for converting any one of an L-ch audio digital signal and a receiving digital signal which are subjected to the interpolation process by the digital filter 109 into the analog signal.

5 Claims, 7 Drawing Sheets

FIG. 6
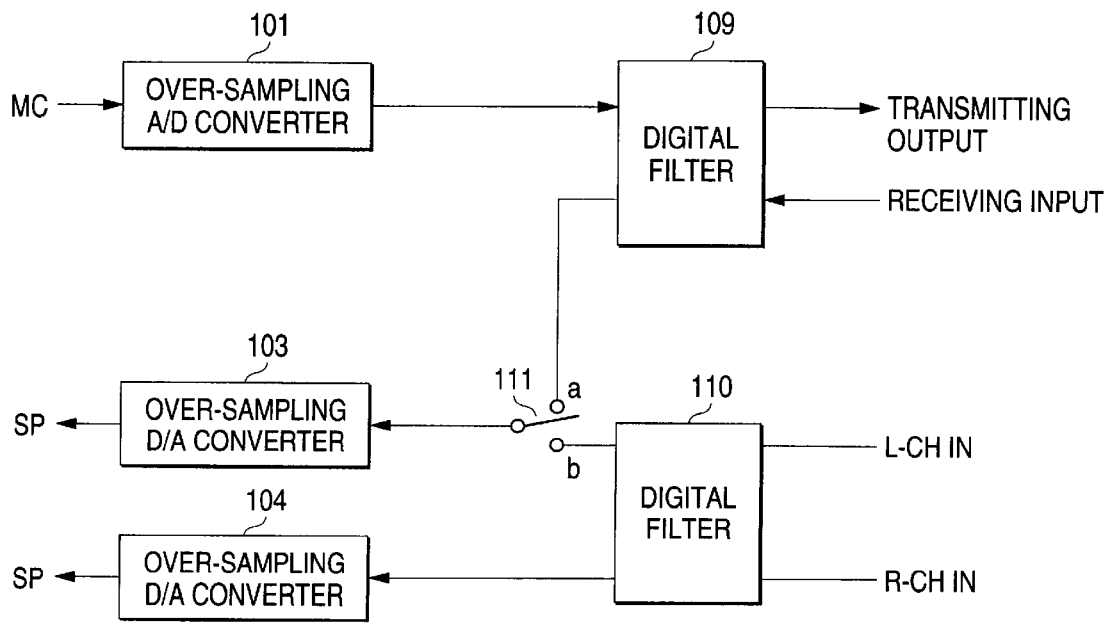
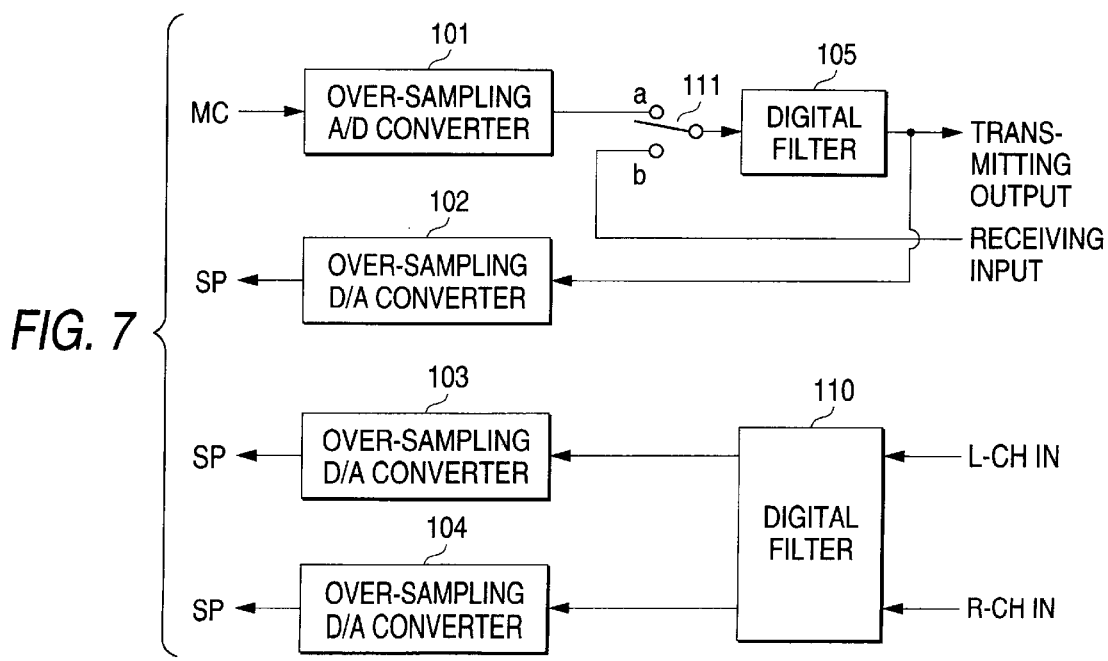
FIG. 7

MOBILE COMMUNICATION TERMINAL DEVICE

BACKGROUND OF THE INVENTION

The present invention relates to a mobile communication terminal device such as a portable telephone, a car telephone, a radio transceiver, or the like.

In recent years, with the higher speed of data communication, various applications of the mobile communication terminal device are thought about in addition to the application of sound communication as a basic function. As one of them, there may be listed a music broadcasting service. This music broadcasting service is provided to playback the digital audio music data, in that the digital audio music data stored in the CD (Compact Disk), etc., are broadcasted from the external source via the network, etc. and they are reproduced by the mobile communication terminal device. In order to meet such service, a new hardware must be added to the existing mobile communication terminal device.

In case a music playback function is added to the mobile communication terminal device, such mobile communication terminal device must be equipped with a sound communication function portion and a music playback function portion.

The sound communication function portion includes a pulse code modulation (abbreviated as "PCM" hereinafter) CODEC having an analog-to-digital (abbreviated as "A/D" hereinafter) converter portion for converting a transmitting analog signal, which is transmitted, into a transmitting digital signal, and a digital-to-analog (abbreviated as "D/A" hereinafter) converter portion for converting a receiving digital signal, which is received, into a receiving analog signal.

While, the music playback function portion has a music playback function used in the CD player, etc., and includes an audio D/A converter for converting an audio digital signal, which is broadcasted, into an audio analog signal.

FIG. 9 shows a configuration of the existing mobile communication terminal device.

At the time of transmission, the transmitting analog signal, which is output from a microphone, is converted into the transmitting digital signal by an A/D converter constituting PCM-CODEC 203, and then transmitted via a TX (transmitter portion) 201 and an antenna 205.

At the time of reception, the receiving digital signal, which is received via the antenna 205, is converted into the receiving analog signal by a D/A converter constituting the PCM-CODEC 203 via an RX (receiver portion) 202, and then output as the receiving sound via a loudspeaker.

FIG. 10 shows a configuration of the mobile communication terminal device equipped with an audio D/A converter to meet the music broadcasting service.

At the time of transmission, the transmitting analog signal, which is output from the microphone, is converted into the transmitting digital signal by the A/D converter constituting the PCM-CODEC 203, and then transmitted via the TX (transmitter portion) 201 and the antenna 205.

At the time of reception, the receiving digital signal, which is received via the antenna 205, is converted into the receiving analog signal by the D/A converter constituting the PCM-CODEC 203 via the RX (receiver portion) 202, and then output as the receiving sound via the loudspeaker.

Meanwhile, audio digital signals containing the left channel (L-ch) and the right channel (R-ch), which are received via the antenna 205 based on the music broadcasting service, are converted into audio analog signals by an audio D/A converter 204 via the RX (receiver portion) 202, and then are output as audio sounds via the loudspeaker.

FIG. 11 shows a configuration of the PCM-CODEC 203 shown in FIG. 9 and FIG. 10.

The PCM-CODEC 203 includes an over-sampling type A/D converter 101 for converting the transmitting analog signal, which is output from the microphone, into the transmitting digital signal; an over-sampling type D/A converter 102 of the delta-sigma modulation system, for converting the receiving digital signal into the receiving analog signal to output it to the loudspeaker; a digital filter 105 for executing the decimation process of the A/D-converted transmitting digital signal; and a digital filter 106 for executing previously the interpolation process of the receiving digital signal to be D/A-converted.

It is normal that the PCM-CODEC 203 has a 8-bit data word length of the $\mu$-law, but the CODEC which is extended up to 14 bit in place of the $\mu$-law may be used according to the specification. The sampling frequency is 8 kHz.

FIG. 12 shows a configuration of the audio D/A converter 204.

The audio D/A converter 204 converts the audio digital signals containing the L-ch and the R-ch into analog signals, and includes digital filters 107, 108 for executing the interpolation process the L-ch and R-ch digital signals respectively, and over-sampling type D/A converter 103, 104 for converting the L-ch and R-ch digital signals, which have been subjected to the interpolation process, in the analog signal respectively.

The audio D/A converter 204 is employed in the digital audio such as CD, etc. The data word length is 16 bit (there is 24 bit in DVD (Digital Video Disk), etc.). The sampling frequency is 44.1 kHz in the CD, and is about 32 kHz to 48 kHz in other digital audio systems.

An operation of the PCM-CODEC 203 shown in FIG. 11 will be explained hereinafter.

At the time of transmission, the transmitting analog signal, which is output from the microphone, is converted into the transmitting digital signal by the over-sampling type A/D converter 101 by using the delta-sigma modulation system, then is input into a digital filter 105 to accept the decimation process, and then is sent out to the transmitter portion as the transmitting output.

As the over-sampling frequency, the sampling clock which is several tens to several hundreds times the sampling clock used in the A/D conversion of the normal sound signal, for example, is employed. In the portable telephone, etc., the sampling frequency of 8 kHz is standard for the sound and the over-sampling frequency of 1.024 MHz which is 128 times the sampling frequency, for example, is employed.

In the A/D converter 101 of such delta-sigma modulation system, the so-called noise shaping operation and the over-sampling operation are performed, and the output (noise shaping output) is a 1-bit signal which has been subjected to the PDM (Pulse Density Modulation). The 1-bit PDM bit stream output is down-sampled up to 8 kHz, which is the sampling frequency of the sound data, by the digital (decimation) filter 105 and is also converted into digital data of a predetermined bit number.

At the time of reception, the receiving digital signal, which is supplied from the outside as the receiving input, is over-sampled by the digital filter 106 to limit the bandwidth, and then input into the over-sampling type D/A converter 102. Here, the sound signal being converted into the receiving analog signal is supplied to the loud speaker and output as the telephone sound.

The digital filter 106 executes the quadruple over-sampling process and the bandwidth limiting process of the digital signal being input at the sampling frequency of 8 kHz. In addition, the digital filter 106 attenuates these fold-over frequency components simultaneously with the over-sampling process. Over-sampling data being processed by the digital filter 106 are input into the over-sampling type D/A converter 102 consisting of a noise shaper and an analog integration circuit, and then a 32-tuple over-sampling/ noise shaping process, for example, is applied to the data by the noise shaper to generate digital data as 1-bit stream data (compression waves generated by PDM). Also, this digital data is converted into the analog signal by the analog integration circuit by applying the integration process.

With the above, the operation of the PCM-CODEC 203 is explained. In this case, the digital filter 106 and the D/A converter 102 constituting the PCM-CODEC 203 and the audio D/A converter 103, 104 shown in FIG. 12 are different in the sampling frequency, the over-sampling rate, the circuit configuration according to the specification, etc., but they are similar in operation to each other. That is, the PCM-CODEC 203 shown in FIG. 11 and the audio D/A converter 204 shown in FIG. 12 are different in the data word length and the sampling frequency respectively, but they are common in that they execute the D/A conversion of the delta-sigma modulation system and the collaboration process made by the digital filter respectively. The circuit configurations for executing respective operations are differentiated based on the target specification and the difference in accuracy.

FIG. 13 shows a circuit configuration employed when the mobile communication terminal device picks up the music broadcasting service based on the PCM-CODEC 203 shown in FIG. 11 and the audio D/A converter 204 shown in FIG. 12. In this case, same symbols are affixed to parts similar to the parts shown in FIG. 11 and FIG. 12, and their detailed explanations will be omitted.

At the time of transmission, the transmitting analog signal being output from the microphone is converted into the transmitting digital signal by the A/D converter 101, then input in the digital filter 109 to accept the decimation process, and then output as the transmitting output.

At the time of reception, the receiving digital signal being supplied from the outside as the receiving input is input into the digital filter 109 to accept the interpolation process, then input into the D/A converter 102, and then converted into the receiving analog signal. After this, the analog signal is supplied to the loudspeaker and then output as the telephone sound. The digital filter 109 executes the decimation process and the interpolation process on time-division basis.

Meanwhile, the broadcasted L-ch and R-ch audio digital signals are input into the digital filter 110 respectively to accept the interpolation process, then input into the D/A converters 103, 104 to be converted into the analog signals, and then supplied to the loudspeaker. The digital filter 110 executes the interpolation process of the input audio digital signal for respective channels on time-division basis.

According to the above configuration, the user can listen to the L-ch and R-ch audio sounds while transmitting/receiving the telephone sound.

However, there is such a problem that, since the configuration shown in FIG. 13 provides independently the speech (reception and transmission) process portion and the music sound playback portion, the power consumption is increased with the increase in the circuit scale.

As described above, the normal PCM-CODEC has the 8 kHz sampling and the 8-bit resolution. In this case, the circuit scale to achieve the 12 to 13 bit precision is needed because of the $\mu$-law. In contrast, the audio D/A converter has the 44.1 kHz sampling and the 16-bit resolution.

The circuit scale is affected by the difference in the bit number. In case the audio D/A converter is added, the circuit scale is extended from about 14 bit to about 16 bit and therefore the circuit scale is increased by the increased bit number. In addition, since the configuration must respond to two channels of L-ch and R-ch, the circuit scale is increased at least two times the circuit scale of the PCM-CODEC only.

In contrast, since the audio D/A converter needs two channels, it needs two times the power consumption of the D/A converter portion of the PCM-CODEC. Also, since the sampling frequency is increased from 8 kHz to 44.1 kHz, i.e., about 5.5 times, the 5.5-times operation frequency is needed to execute the similar filter operation. Accordingly, the eleven-times (5.5 (sampling)×2 (ch)=11) power consumption is needed in contrast to the power consumption necessary for the D/A conversion of the PCM-CODEC. Furthermore, the increase in the power consumption caused by the increase in the circuit scale based on the difference in the bit number is added.

According to the above results, it can be understood that, if the audio D/A converter is equipped to meet the music broad casting service, the circuit scale of the mobile communication terminal device is increased and also the power consumption is increased especially. The low power consumption is requested because it is premised on such an assumption that the mobile communication terminal device is operated by the battery. Under the circumstance that the existing mobile communication terminal device that is equipped only with the PCM-CODEC needs the considerable power consumption, it is impractical in a point of the power consumption to further equip the audio D/A converter.

SUMMARY OF THE INVENTION

The present invention has been made in view of such respects, and it is an object of the present invention to provide a mobile communication terminal device capable of reducing a circuit scale and reducing a power consumption upon meeting a music broadcasting service in addition to transmission/reception of a telephone sound.

In order to achieve the above object, in the mobile communication terminal device that is able to meet the new services such as the music broadcasting in addition to the transmission/reception of the telephone sound, the present invention takes account of the fact that the digital filters and the over-sampling type D/A converters existing commonly in the PCM-CODEC and the audio D/A converters constituting the terminal device can be used commonly, and thus makes it possible to reduce the circuit scale and reduce the power consumption by sharing the digital filters and the over-sampling type D/A converters and achieving the rationalization of the operation speed, the operation mode, etc.

A mobile communicating terminal device according to first aspect of the present invention comprises an A/D converter for converting a transmitting analog signal into a transmitting digital signal; a first selector for selecting any one of an output of the A/D converter and one channel of broadcasted audio digital signals; a second selector for selecting any one of a receiving digital signal and the other channel of the audio digital signals; a digital filter, to one input of which a first output of the first selector is supplied and to the other input of which a second output of the second selector is supplied, for applying a decimation process to the first output to send out to an outside if the first output is an output of the A/D converter, and for applying an interpolation process to the first output and applying the interpolation process to the second output if the first output is one channel of the audio digital signals, whereby the first output and the second output can be processed on time-division basis; a first D/A converter for converting one channel of the audio digital signals, which is subjected to the interpolation process by the digital filter, into an analog signal; and a second D/A converter for converting any one of the other channel of the audio digital signals and the receiving digital signal, which are subjected to the interpolation process by the digital filter, into the analog signal in synchronism with a selecting operation of the second selector.

A mobile communication terminal device according to second aspect of the invention comprises an A/D converter for converting a transmitting analog signal into a transmitting digital signal; a digital filter, to one input of which an output of the A/D converter is supplied and to the other input of which a receiving digital signal is supplied, for applying a decimation process to the output of the A/D converter to send out to an outside, and applying an interpolation process to the receiving digital signal, whereby the output of the A/D converter and the receiving digital signal can be processed on time-division basis; a selector for selecting any one of the receiving digital signal, which is subjected to the interpolation process by the digital filter, and one channel of broadcasted audio digital signals; a first D/A converter for converting any one of the receiving digital signal, which is subjected to the interpolation process by the digital filter, and one channel of the audio digital signals into an analog signal in synchronism with a selecting operation of the selector; and a second D/A converter for converting the other channel of the audio digital signals into the analog signal.

According to the above-mentioned first and second aspects, since the digital filters and the D/A converters can be used commonly, not only the circuit scale can be reduced but also the power consumption can be reduced.

A mobile communication terminal device according to third aspect of the invention comprises an A/D converter for converting transmitting analog signal into a transmitting digital signal; first digital filter for applying a decimation process to an output of the A/D converter to send out to an outside; a second digital filter, to one input of which a receiving digital signal or one channel of broadcasted audio digital signals is supplied and to the other input of which the other channel of the audio digital signals is supplied, for applying an interpolation process to the receiving digital signal or one channel of the audio digital signals, and for applying the interpolation process to the other channel of the audio digital signals, whereby the receiving digital signal or one channel of the audio digital signals and the other channel of the audio digital signals can be processed on time-division basis; a first D/A converter for converting the receiving digital signal or one channel of the audio digital signals, which is subjected to the interpolation process by the second digital filter, into an analog signal; and a second D/A converter for converting the other channel of the audio digital signals, which is subjected to the interpolation process by the second digital filter, into the analog signal.

A mobile communication terminal device according to fourth aspect of the invention comprises an A/D converter for converting a transmitting analog signal into a transmitting digital signal; a first digital filter, to one input of which an output of the A/D converter is supplied and to the other input of which a receiving digital signal or one channel of broadcasted audio digital signals is supplied, for applying a decimation process to the output of the A/D converter to send out to an outside, and for applying an interpolation process to the receiving digital signal or one channel of the audio digital signals, whereby the output of the A/D converter and the receiving digital signal or one channel of the audio digital signals can be processed on time- division basis; a second digital filter for applying the interpolation process to the other channel of the audio digital signals; a first D/A converter for converting the receiving digital signal or one channel of the audio digital signals, which is subjected to the interpolation process by the first digital filter, into an analog signal; and a second D/A converter for converting the other channel of the audio digital signals, which is subjected to the interpolation process by the second digital filter, into the analog signal.

A mobile communication terminal device according to fifth aspect of the invention comprises an A/D converter for converting a transmitting analog signal into a transmitting digital signal; a first digital filter, to one input of which an output of the A/D converter is supplied and to the other input of which a receiving digital signal is supplied, for applying a decimation process to the output of the A/D converter to send out to an outside and applying an interpolation process to the receiving digital signal, whereby the output of the A/D converter and the receiving digital signal can be processed on time-division basis; a second digital filter to which both channels of broadcasted audio digital signals are supplied, for applying the interpolation process to both channels of the audio digital signals on time-division basis; a selector for selecting any one of the receiving digital signal, which is subjected to the interpolation process by the first digital filter, and one channel of the audio digital signals, which is subjected to the interpolation process by the second digital filter; a first D/A converter for converting any one of the receiving digital signal, which is subjected to the interpolation process by the first digital filter, and one channel of the audio digital signals, which is subjected to the interpolation process by the second digital filter, into an analog signal in synchronism with a selecting operation of the selector; and a second D/A converter for converting the other channel of the audio digital signals, which is subjected to the interpolation process by the second digital filter, into the analog signal.

According to the above-mentioned third, fourth and fifth aspects of the invention, since the D/A converters can be used commonly, not only the circuit scale can be reduced but also the power consumption can be reduced.

A mobile communication terminal device according to sixth aspect of the invention comprises an A/D converter for converting a transmitting analog signal into a transmitting digital signal; a selector for selecting any one of an output of the A/D converter and a receiving digital signal; a first digital filter to which an output of the selector is supplied, for applying a decimation process to the output of the A/D converter to send out to an outside if the output of the selector is an output of the A/D converter, and for applying an interpolation process to the receiving digital signal if the output of the selector is the receiving digital signal; a second digital filter to which both channels of audio digital signals are supplied, for applying the interpolation process to both channels of the audio digital signals on time-division basis; a first D/A converter for converting the receiving digital signal, which is subjected to the interpolation process by the first digital filter, into an analog signal; a second D/A converter for converting one channel of the audio digital signals, which is subjected to the interpolation process by the second digital filter, into the analog signal; and a third D/A converter for converting the other channel of the audio digital signals, which is subjected to the interpolation process by the second digital filter, into the analog signal.

A mobile communication terminal device according to seventh aspect of the invention comprises an A/D converter for converting a transmitting analog signal into a transmitting digital signal; a selector for selecting any one of an output of the A/D converter and a receiving digital signal; a first digital filter, to one input of which an output of the selector is supplied and to the other input of which one channel of broadcasted audio digital signals is supplied, for applying a decimation process to the output of the A/D converter to send out to an outside if the output of the selector is the output of the A/D converter, and for applying an interpolation process to the receiving digital signal and applying the interpolation process to one channel of the audio digital signals if the output of the selector is the receiving digital signal, whereby the output of the selector and one channel of the audio digital signals can be processed on time-division basis; a second digital filter for applying the interpolation process to the other channel of the audio digital signals; a first D/A converter for converting the receiving digital signal, which is subjected to the interpolation process by the first digital filter, into an analog signal; a second D/A converter for converting one channel of the audio digital signals, which is subjected to the interpolation process by the first digital filter, into the analog signal; and a third D/A converter for converting the other channel of the audio digital signals, which is subjected to the interpolation process by the second digital filter, into the analog signal.

According to the above-mentioned sixth and seventh aspects of the invention, since the 1-input/output type digital filter that is not operated on time-division basis is employed, there is no necessity to increase the operation speed and therefore the power consumption can be reduced.

BRIEF DESCRIPTION OF THE DRAWINGS

FIG. 6 is a block diagram showing a fifth embodiment of the present invention;

FIG. 7 is a block diagram showing a sixth embodiment of the present invention;

DETAILED DESCRIPTION OF THE PREFERRED EMBODIMENTS

Embodiments of the present invention will be explained with reference to the accompanying drawings hereinafter.

First Embodiment

Figure 1:
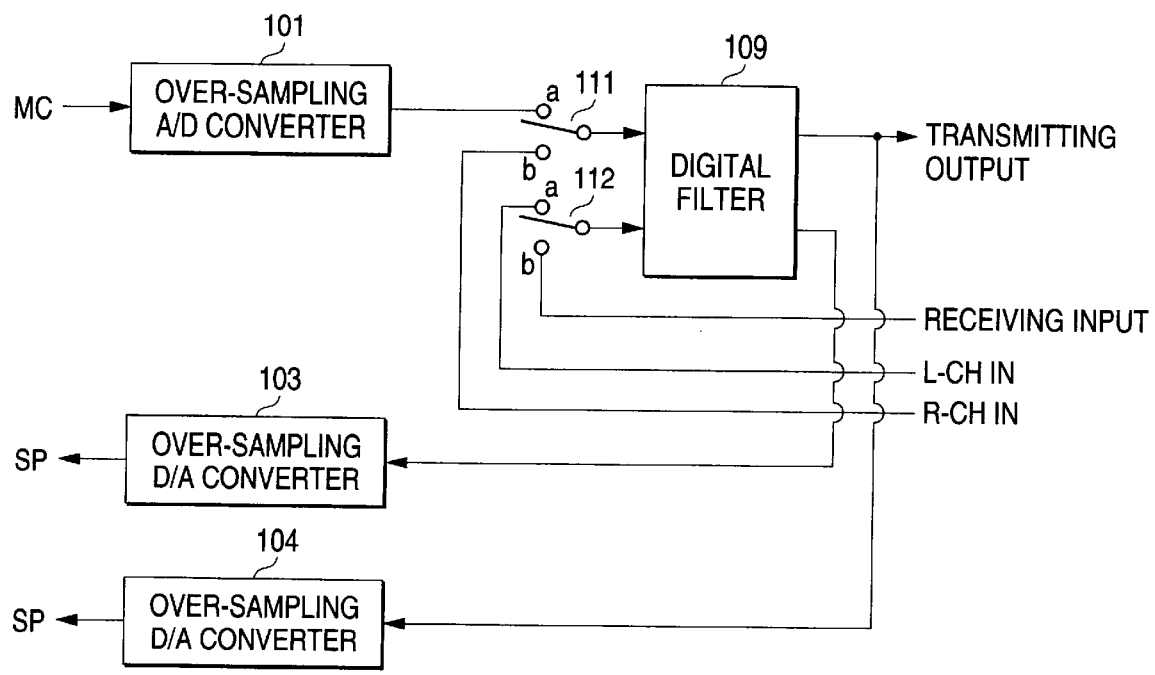
FIG. 1 is a block diagram showing a first embodiment of the present invention.

FIG. 1 shows a first embodiment of the present invention, and contains a PCM-CODEC function for coding/decoding the telephone sound signal and a D/A converting function for decoding the broadcasted digital audio signal. The first embodiment comprises an over-sampling type A/D converter 101 for converting a transmitting analog signal output from a microphone into a transmitting digital signal; a multiplexer (first selector) 111 for selecting any one of an output of the A/D converter 101 and a broadcasted R-ch audio digital signal; a multiplexer (second selector) 112 for selecting any one of a receiving digital signal (receiving input) received and an L-ch audio digital signal; a 2-input/output type digital filter 109, to one input of which an output of the multiplexer 111 (first output) is supplied and to the other input of which an output of the multiplexer 112 (second output) is supplied, for applying a decimation process to the first output to send out to an outside if the first output is an output of the A/D converter 101, and for applying an interpolation process to the first output and applying the interpolation process to the second output if the first output is the R-ch audio digital signal, whereby the first output and the second output can be processed on time-division basis; an over-sampling type D/A converter (first D/A converter) 104 for converting the R-ch audio digital signal, which is subjected to the interpolation process by the digital filter 109, into an analog signal; and an over-sampling type D/A converter (second D/A converter) 103 for converting anyone of the L-ch audio digital signal and the receiving digital signal, which are subjected to the interpolation process by the digital filter 109, into the analog signal in synchronism with a selecting operation of the multiplexer 112.

Following operations can be carried out by the above configuration.

1. To transmit/receive the telephone sound.
2. To playback the broadcasted audio sounds (L-ch, R-ch)
3. To playback any one channel of the audio sounds (L-ch, R-ch) while transmitting the telephone sound.
4. To playback any one channel of the audio sounds (L-ch, R-ch) while receiving the telephone sound.

In the case of above operation modes 3, 4, the digital filter 109 must operate the sampling clock for the telephone sound and the sampling clock for the audio sound so as to switch them on time-division basis.

The operation mode 1 can implement the telephone function for generating simultaneously the transmission/reception of the telephone sound by using the configuration shown in FIG. 1 as the PCM-CODEC.

The operation mode 2 can implement the music playback function for playing back the broadcasted audio sounds (L-ch, R-ch) via a built-in loudspeaker or a headphone by using the configuration shown in FIG. 1 as the audio D/A converter.

The operation modes 3, 4 use the configuration shown in FIG. 1 as the PCM-CODEC and the audio D/A converter. The operation mode 3 can playback one channel of the audio sounds (L-ch, R-ch) while transmitting the telephone sound. The operation mode 4 can playback one channel of the audio sounds (L-ch, R-ch) while receiving the telephone sound.

The operation modes 1, 2 are limited to any one of the transmission/reception of the telephone sound and the music playback. In the normal use mode, the operation modes are effective in the case where the above operations are not needed simultaneously.

Respective operation modes will be explained hereunder. Respective operation modes can be selected by switching the multiplexers 111, 112.

In the operation mode 1, at the time of transmission, the transmitting analog signal being output from the microphone is input into the A/D converter 101 and converted into the transmitting digital signal, and then input into one channel of the digital filter 109 via the multiplexer 111 that selects he fixed terminal a. One channel of the digital filter 109 unctions as the decimation filter to execute the decimation process of the output from the A/D converter 101, whereby the transmitting output can be obtained.

At the time of reception, the receiving input is input into one channel of the digital filter 109 via the multiplexer 112 that selects the fixed terminal a. One channel of the digital filter 109 functions as the interpolation filter, and performs the interpolation process of the receiving input. The receiving input that is subjected to the interpolation process is input into the D/A converter 103 and converted into the receiving analog signal, and then output as the receiving sound via the loudspeaker.

In the operation mode 1, the digital filter 109 executes the decimation process and the interpolation process on time-division basis. Also, since the D/A converter 104 is not employed, the power-supply is cut off to suppress the power consumption.

In the operation mode 2, the audio digital signals (L-ch, R-ch) are input into the digital filter 109 via the multiplexers 111, 112 that select the fixed terminal b respectively. Then, the L-ch audio digital signal is input into the D/A converter 103 and then converted into the audio analog signal, while the R-ch audio digital signal is input into the D/A converter 104 and then converted into the audio analog signal. Both analog signals are output as the audio signal via the loudspeaker respectively. In this case, the audio analog signals may be output via the headphone.

In the operation mode 2, the power-supply is cut off to suppress the power consumption since the A/D converter 101 is not employed.

In the operation mode 3, the transmitting analog signal being output from the microphone is input into the A/D converter 101 and converted into the transmitting digital signal, and then input into one channel of the digital filter 109 via the multiplexer 111 that selects the fixed terminal a. The digital filter 109 executes the decimation process of the transmitting digital signal, so that the transmitting output can be obtained.

The L-ch audio digital signal is input into the other channel of the digital filter 109 via the multiplexer 112 that selects the fixed terminal b to accept the interpolation process, then input into the D/A converter 103, and then converted into the L-ch audio analog signal.

The digital filter 109 executes the decimation process for the transmitting digital signal and the interpolation process for the L-ch audio digital signal on time-division basis.

In the operation mode 3, the power-supply is cut off to suppress the power consumption since the D/A converter 104 is not used.

In the operation mode 4, the receiving input is input into one channel of the digital filter 109 via the multiplexer 112, that selects the fixed terminal a, to accept the interpolation process, then input into the D/A converter 103 to be converted into the receiving analog signal, and then output as the receiving sound via the speaker.

The R-ch audio digital signal is input into one channel of the digital filter 109 via the multiplexer 111 that selects the fixed terminal b to accept the interpolation process, then input into the D/A converter 104, and then converted into the R-ch audio analog signal.

The digital filter 109 executes alternatively the interpolation process for the receiving input and the interpolation process for the R-ch audio digital signal on time-division basis.

In the operation mode 4, the power-supply is cut off to suppress the power consumption since the A/D converter 101 is not used.

In this case, in the above operation modes, the audio digital signal may have the polarity opposite to the illustrated polarity.

Figure 13:
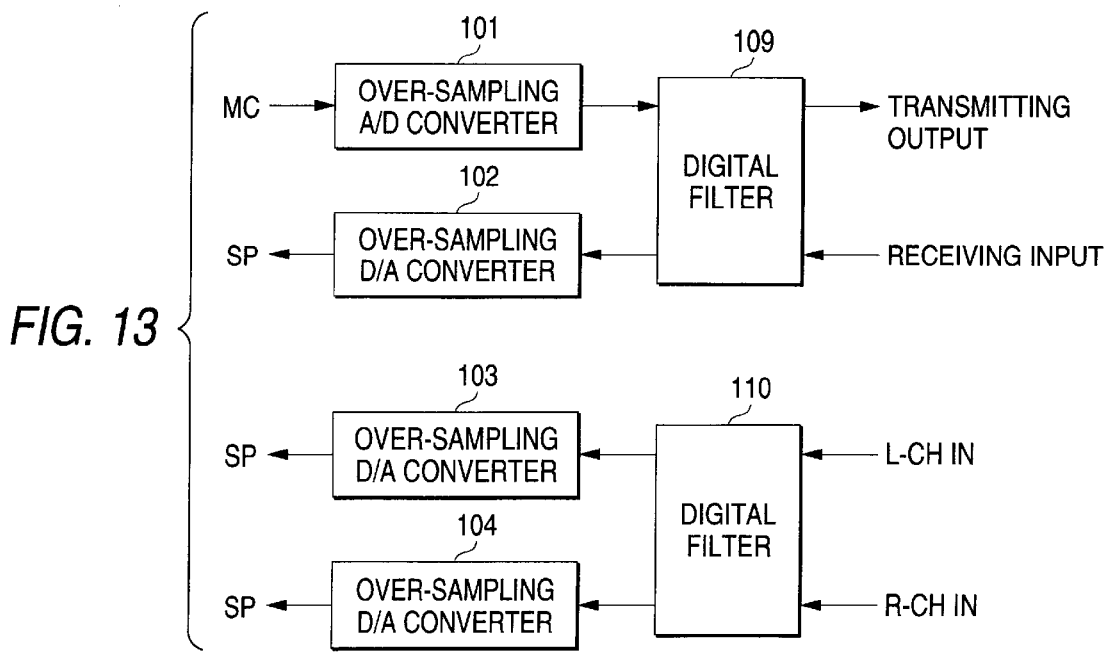
FIG. 13 is a block diagram showing a configuration of the mobile communication terminal device to meet the music broadcasting service based on the PCM-CODEC 203 shown in FIG. 11 and the audio D/A converter 204 shown in FIG. 12.

According to the configuration shown in FIG. 1, two digital filters in the configuration shown in FIG. 13 in the prior art can be unified into one filter, and three D/A converters can be unified into two converters by integrating two converters together. Accordingly, the circuit scale can be reduced and also the power consumption can be reduced.

In the illustrated example, the over-sampling type D/A converter 103 executes commonly operations of the receiving digital signal and the audio digital signal on one channel, but respective converters may be provided independently. In this case, only the digital filter 109 is shared.

Also, the digital filter 109 shares a part of the hardware configuration and operates a part of it on time-division basis such that it can operate as the decimation filter upon converting into the digital signal by the A/D converter 101 and operates as the interpolation filter upon converting into the analog signal by the D/A converters 103, 104. Therefore, the operation speed becomes twice the normal one. In contrast, the operation speed may be reduced to half by providing the decimation filter and the interpolation filter respectively not to operate the digital filter on time-division basis.

In addition, the digital filter 109 that functions as the interpolation filter executes the audio digital signal for two channels on time-division basis upon playing back the L-ch and R-ch audio signals. Therefore, the operation speed becomes twice the normal one. In contrast, the operation speed may be reduced to half by providing two sets of interpolation filters not to operate the digital filter on time-division basis.

Second Embodiment

A second embodiment of the present invention will be explained with reference to FIG. 2 hereinafter.

The second embodiment comprises the over-sampling type A/D converter 101 for converting the transmitting analog signal output from the microphone into the transmitting digital signal; the 2-input/output type digital filter 109, to one input of which the output of the A/D converter 101 is supplied and to the other input of which the receiving digital signal is supplied, for applying the decimation process to the output of the A/D converter 101 to send out to the outside, and applying the interpolation process to the receiving digital signal, whereby the output of the A/D converter 101 and the receiving digital signal can be processed on time-division basis; the multiplexer (selector) 111 for selecting any one of the receiving digital signal, which is subjected to the interpolation process by the digital filter 109, and the broadcasted L-ch audio digital signal; the over-sampling type D/A converter (first D/A converter) 103 for converting any one of the receiving digital signal, which is subjected to the interpolation process by the digital filter 109, and the L-ch audio digital signal into the analog signal in synchronism with the selecting operation of the multiplexer 111; and the over-sampling type D/A converter (second D/A converter) 104 for converting the R-ch audio digital signal into the analog signal.

In the second embodiment, the digital filter that executes the interpolation process prior to the D/A conversion process is omitted from FIG. 1 by taking account of the event that the frequency band width of the fold over components of the audio digital signals (L-ch, R-ch) is out of the audible bandwidth.

More particularly, if the aliasing noise generated in the D/A conversion can be perfectly cut off by the ideal analog filter, the digital filter that performs the interpolation process is not needed essentially. For example, in the case of the digital audio such as CD that is the application until the band 20 kHz, etc., the sampling frequency is 44.1 kHz. The foldover components become the noise components every integral multiple of the sampling frequency (fs) acting as a foldover point. No problem is caused if such foldover components can be perfectly cut off by the ideal analog filter at the point of the band 20 kHz, but it is impossible actually to constitute such analog filter. For this reason, the digital filter is employed to reduce the load of the analog filter. Therefore, if the digital filter is not employed, the foldover components are generated like the prior art. However, actually the audible frequency bandwidth of the audible sound of the human being is narrower than 20 kHz, and it is said that such audible frequency bandwidth is below about 15 to 16 kHz.

Figure 3A:
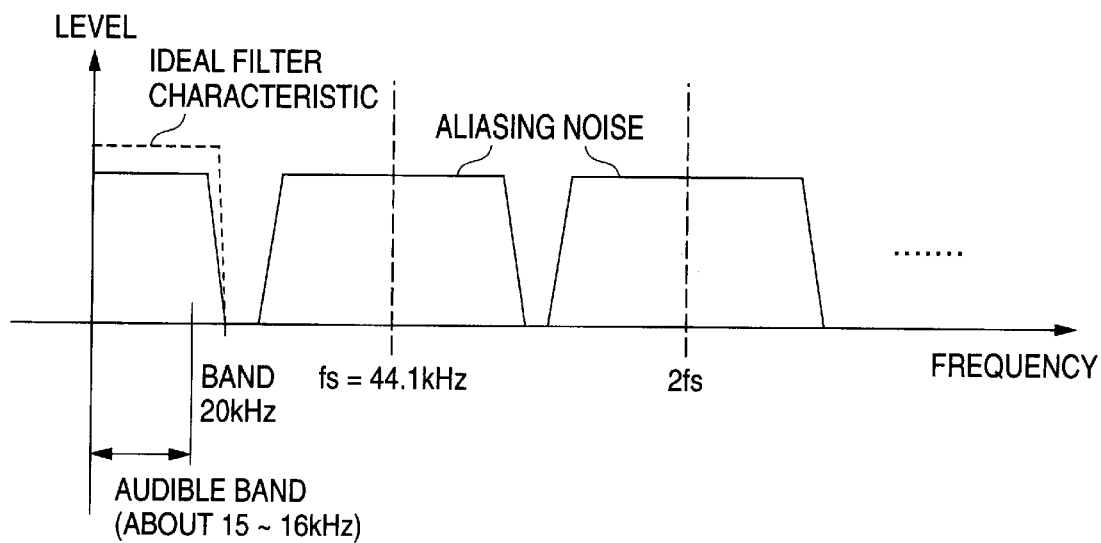
FIG. 3A is a view showing a relationship between an aliasing noise and an audible band in the digital audio.
Figure 3B:
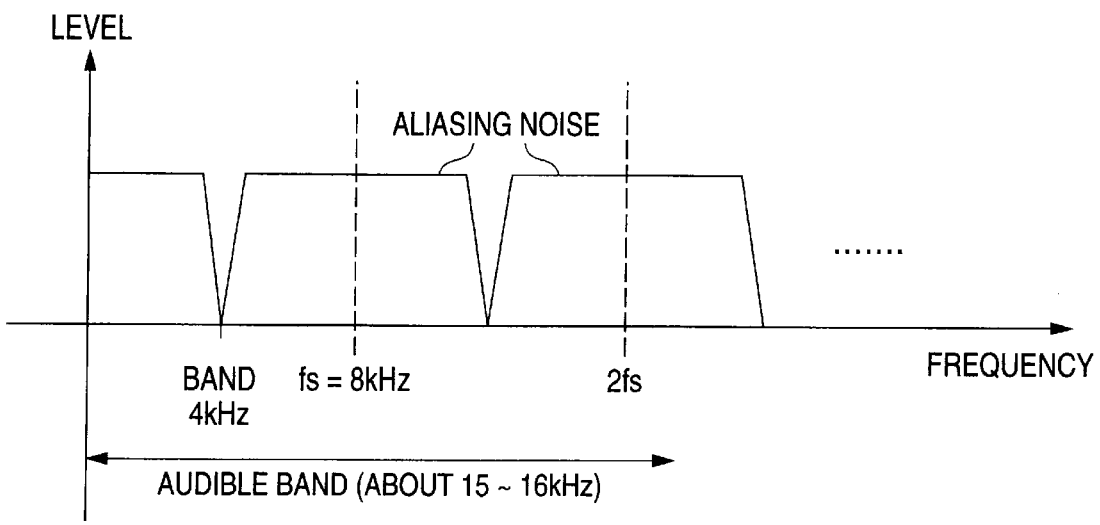
FIG. 3B is a view showing a relationship between an aliasing noise and an audible band in the telephone sound.

As shown in FIG. 3A, if the foldover component is present in the range from 20 kHz to 44.1 kHz, this frequency is out of the audible band of the human being. Thus, the particular problem is not caused unless such foldover component is not cut off by the digital filter. On the contrary, as shown in FIG. 3B, in case the telephone sound is processed, the band 4 kHz and the sampling frequency 8 kHz are used and thus the foldover component is generated in the audible band. Accordingly, in this case, the hearing feeling becomes worse extremely if the foldover component is not cut off by the digital filter.

Figure 2:
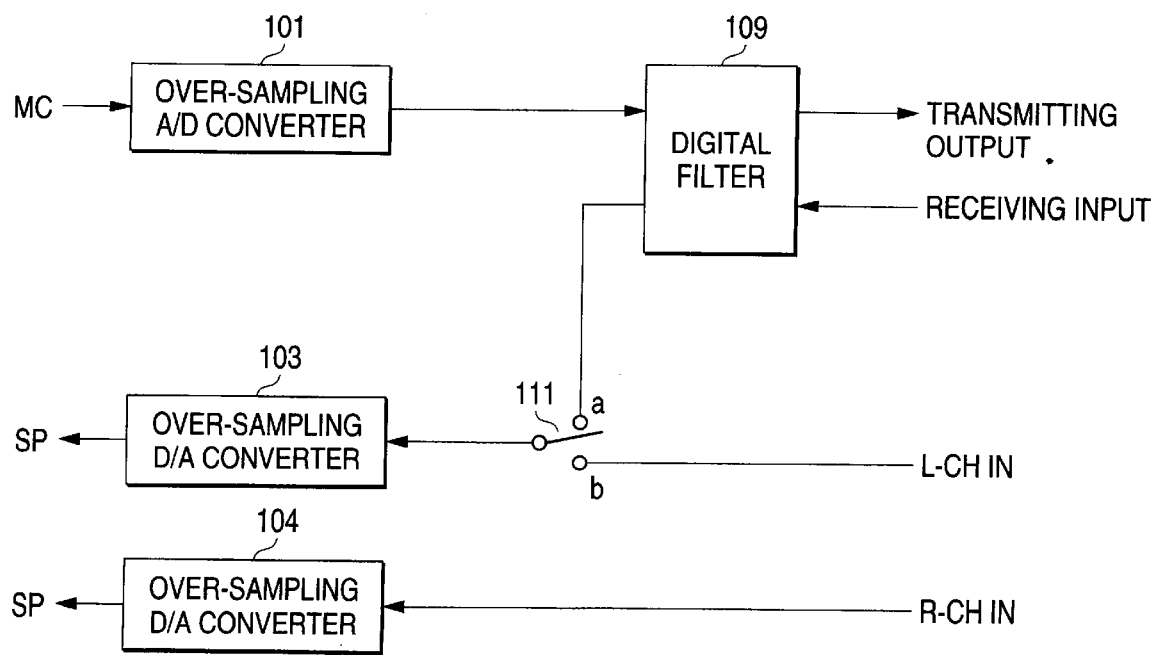
FIG. 2 is a block diagram showing a second embodiment of the present invention.

Following operations can be carried out by the configuration shown in FIG. 2.

1. To transmit/receive the telephone sound.
2. To playback the broadcasted audio sounds (L-ch, R-ch)
3. To playback the audio sounds (L-ch, R-ch) while transmitting the telephone sound.
4. To playback any one channel of the audio sounds (L-ch, R-ch) while receiving the telephone sound.
5. To playback any one channel of the audio sounds (L-ch, R-ch) while transmitting/receiving the telephone sound.

The operation mode 1 can implement the telephone function for generating simultaneously the transmission/reception of the telephone sound by using the configuration shown in FIG. 2 as the PCM-CODEC.

The operation mode 2 can implement the music playback function for playing back the broadcasted audio sounds (L-ch, R-ch) via the loudspeaker or the headphone by using the configuration shown in FIG. 2 as the audio D/A converter.

The operation modes 3 to 5 use the configuration shown in FIG. 2 as the PCM-CODEC and the audio D/A converter. The operation mode 3 can playback the audio sounds (L-ch, R-ch) while transmitting the telephone sound. The operation mode 4 can playback one channel of the audio sounds (L-ch, R-ch) while receiving the telephone sound. The operation mode 5 can playback one channel of the audio sounds (L-ch, R-ch) while transmitting/receiving the telephone sound.

The operation modes 1, 2 are limited to any one of the transmission/reception of the telephone sound and the music playback. In the normal use mode, the operation modes are effective in the case where the above operations are not needed simultaneously.

Respective operation modes will be explained hereunder.

In the operation mode 1, at the time of transmission, the transmitting analog signal being output from the microphone is input into the A/D converter 101 and converted into the transmitting digital signal, and then input into one channel of the digital filter 109 to accept the decimation process, whereby the transmitting output can be obtained.

At the same time, the receiving input is input into one channel of the digital filter 109 to accept the interpolation process, and then input into the D/A converter 103 via the multiplexer 111 that selects the fixed terminal a and converted into the analog signal, whereby the analog signal is output via the loudspeaker.

In the operation mode 1, since the D/A converter 104 is not employed, the power-supply is cut off to suppress the power consumption.

In the operation mode 2, the L-ch audio digital signal is input into the D/A converter 103 via the multiplexer 111 that selects the fixed terminal b and then converted into the L-ch audio analog signal. The R-ch audio digital signal is input into the D/A converter 104 and then converted into the R-ch audio analog signal. The L-ch and R-ch audio analog signals are output via the loudspeaker respectively. In this case, the L-ch and R-ch audio analog signals may be output via the headphone.

In the operation mode 2, the power-supply is cut off to suppress the power consumption since the A/D converter 101 is not employed.

In the operation mode 3, the transmitting analog signal being output from the microphone is input into the A/D converter 101 and converted into the transmitting digital signal, and then input into one channel of the digital filter 109 to accept the decimation process, so that the transmitting output can be obtained.

The L-ch audio digital signal is input into the D/A converter 103 via the multiplexer 112 that selects the fixed terminal b, and then converted into the L-ch audio analog signal. The R-ch audio digital signal is input into the D/A converter 104, and then converted into the R-ch audio analog signal. The L-ch and R-ch audio analog signals are output via the loudspeaker respectively. In this case, the L-ch and R-ch audio analog signals may be output via the headphone.

In the operation mode 3, since the digital filter 109 occupies only one channel, such digital filter 109 is operated at the half speed rather than the case where two channels are occupied on time-division basis.

In the operation mode 4, the receiving input is input into the digital filter 109 to accept the interpolation process, and then is input into the D/A converter 103 via the multiplexer 111 that selects the fixed terminal a and converted into the receiving analog signal. The R-ch audio digital signal is input into the D/A converter 104, and then converted into the R-ch audio analog signal.

In the operation mode 4, the power-supply is cut off to suppress the power consumption since the A/D converter 101 is not used. Also, since the digital filter 109 occupies only one channel, such digital filter 109 is operated at the half speed in comparison with the case where two channels are occupied on time-division basis.

The operation mode 5 operates the D/A converter 104 in addition to the operation in the operation mode 4. The R-ch audio digital signal is input into the D/A converter 104 and then converted into the R-ch audio analog signal.

In this case, in respective operation modes, the audio digital signal may have the polarity opposite to the illustrated polarity.

According to the configuration shown in FIG. 2, two digital filters in the configuration shown in FIG. 13 in the prior art can be unified into one filter, and three D/A converters can be unified into two converters by integrating two converters together. Accordingly, the circuit scale can be reduced and also the power consumption can be reduced.

In the illustrated example, the over-sampling type D/A converter 103 executes commonly operations of the receiving digital signal and the audio digital signal on one channel, but respective converters may be provided independently. In this case, only the digital filter 109 is shared. However, since the D/A converter is provided to the receiving signal and the audio signal respectively, this configuration can respond to any broadcasting service without the restriction due to the circuit reduction.

Also, the digital filter 109 shares a part of the hardware configuration and operates a part of it on time- division basis such that it can operate as the decimation filter and the interpolation filter. Therefore, the operation speed becomes twice the normal one. In contrast, the operation speed may be reduced to half by providing the decimation filter and the interpolation filter respectively not to operate the digital filter on time-division basis.

Third Embodiment

A third embodiment of the present invention will be explained with reference to FIG. 4 hereinafter.

The third embodiment comprises the over-sampling type A/D converter 101 for converting the transmitting analog signal output from the microphone into the transmitting digital signal; a 1-input/output type digital filter (first digital filter) 105 for applying the decimation process to the output of the A/D converter 101 to send out to the outside; a 2-input/output type digital filter (second digital filter) 110, to one input of which the receiving digital signal or the broadcasted L-ch audio digital signal is supplied and to the other input of which the R-ch audio digital signal is supplied, for applying the interpolation process to the receiving digital signal or the L-ch audio digital signal, and for applying the interpolation process to the R-ch audio digital signal, whereby the receiving digital signal or the L-ch audio digital signal and the R-ch audio digital signal can be processed on time-division basis; the over-sampling type D/A converter (first D/A converter) 103 for converting the receiving digital signal or the L-ch audio digital signal, which is subjected to the interpolation process by the digital filter 110, into the analog signal; and the over-sampling type D/A converter (second D/A converter) 104 for converting the R-ch audio digital signal, which is subjected to the interpolation process by the digital filter 110, into the analog signal.

Figure 4:
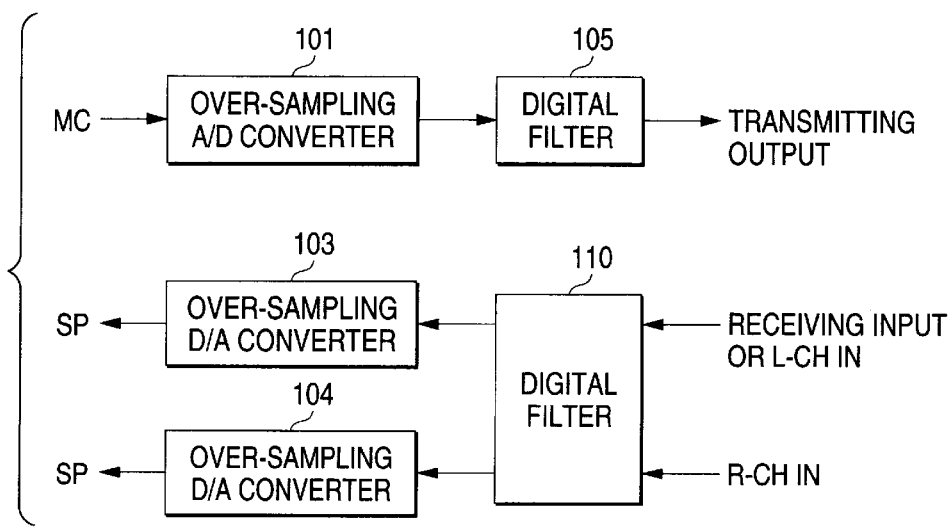
FIG. 4 is a block diagram showing a third embodiment of the present invention.

Following operations can be carried out by the configuration shown in FIG. 4.

1. To transmit/receive the telephone sound.
2. To playback the broadcasted audio sounds (L-ch, R-ch)
3. To playback the audio sounds (L-ch, R-ch) while transmitting the telephone sound.
4. To playback any one channel of the audio sounds (L-ch, R-ch) while transmitting/receiving the telephone sound.

The operation mode 1 can implement the telephone function for generating simultaneously the transmission/reception of the telephone sound by using the configuration shown in FIG. 3 as the PCM-CODEC.

The operation mode 2 can implement the music playback function for playing back the broadcasted audio sounds (L-ch, R-ch) via the loudspeaker or the headphone by using the configuration shown in FIG. 3 as the audio D/A converter.

The operation modes 3 and 4 use the configuration shown in FIG. 3 as the PCM-CODEC and the audio D/A converter. The operation mode 3 can playback the audio sounds (L-ch, R-ch) while transmitting the telephone sound. The operation mode 4 can playback one channel of the audio sounds (L-ch, R-ch) while transmitting/receiving the telephone sound.

The operation modes 1, 2 are limited to any one of the transmission/reception of the telephone sound and the music playback. In the normal use mode, the operation modes are effective in the case where the above operations are not needed simultaneously.

The operation mode 3 can playback both channels of the audio sound, but it is limited to the transmission of the telephone sound. In this case, it may be considered that, while listening to the audio sound, the transmitting contents are stored in a memory device installed in the mobile communication terminal device or are transmitted.

Respective operation modes will be explained hereunder.

In the operation mode 1, at the time of transmission, the transmitting analog signal being output from the microphone is input into the A/D converter 101 and converted into the transmitting digital signal, and then input into the digital filter 105 to accept the decimation process, whereby the transmitting output can be obtained.

At the same time, the receiving input is input into one channel of the digital filter 110 to accept the interpolation process, then input into the D/A converter 103 and converted into the receiving analog signal, and then output via the loudspeaker.

In the operation mode 1, since the D/A converter 104 is not employed, the power-supply is cut off to suppress the power consumption. Also, since the digital filter 110 occupies only one channel, such digital filter 110 is operated at the half speed rather than the case where two channels are occupied on time-division basis.

In the operation mode 2, the L-ch and R-ch audio digital signals are input into the D/A converter 110 and are subjected to the interpolation process on time-division basis, then input into the D/A converters 103, 104 respectively and converted into the L-ch and R-ch audio analog signals, and then output via the loudspeaker respectively. In this case, the L-ch and R-ch audio analog signals may be output via the headphone.

In the operation mode 2, the power-supply is cut off to suppress the power consumption since the A/D converter 101 and the digital filter 105 are not employed.

The operation mode 3 operates the A/D converter 101 in addition to the operation in the operation mode 2. The transmitting analog signal being output from the microphone is input into the A/D converter 101 and converted into the transmitting digital signal, and then input into the digital filter 105 to accept the decimation process, whereby the transmitting output can be obtained.

The operation mode 5 operates the D/A converter 104 in addition to the operation in the operation mode 1. The R-ch audio digital signal is input into one channel of the digital filter 110 to accept the interpolation process, then input into the D/A converter 104 and converted into the R-ch audio analog signal, and then output via the loudspeaker.

In this case, in respective operation modes, the audio digital signal may have the polarity opposite to the illustrated polarity.

According to the configuration shown in FIG. 4, since one of two digital filters in the configuration shown in FIG. 13 in the prior art can be composed of a 1-input/output filter, the time-division operation is not needed. Thus, there is no necessity to increase the operation speed, and thus the power consumption can be reduced. In addition, since three D/A converters can be unified into two converters by integrating two converters together, the circuit scale can be reduced and also the power consumption can be reduced.

In the illustrated example, the over-sampling type D/A converter 103 executes commonly operations of the receiving digital signal and the audio digital signal on one channel, but respective converters may be provided independently.

Also, the digital filter 110 shares a part of the hardware configuration and operates a part of it on time-division basis such that it can operate as the interpolation filter for two channels. Therefore, the operation speed becomes twice the normal one. In contrast, the operation speed may be reduced to half by providing the interpolation filter for two channels not to operate the digital filter on time-division basis.

Fourth Embodiment

A fourth embodiment of the present invention will be explained with reference to FIG. 5 hereinafter.

The fourth embodiment comprises the over-sampling type A/D converter 101 for converting the transmitting analog signal output from the microphone into the transmitting digital signal; the 2-input/output type digital filter (first digital filter) 109, to one input of which the output of the A/D converter 101 is supplied and to the other input of which the receiving digital signal or the broadcasted L-ch audio digital signal is supplied, for applying the decimation process to the output of the A/D converter 101 to send out to the outside, and for applying the interpolation process to the receiving digital signal or the L-ch audio digital signal, whereby the output of the A/D converter 101 and the receiving digital signal or the L-ch audio digital signal can be processed on time-division basis; a 1-input/output type digital filter (second digital filter) 108 for applying the interpolation process to the R-ch audio digital signal; the over-sampling type D/A converter (first D/A converter) 103 for converting the receiving digital signal or the L-ch audio digital signal, which is subjected to the interpolation process by the digital filter 109, into the analog signal; and the over-sampling type D/A converter (second D/A converter) 104 for converting the R-ch audio digital signal, which is subjected to the interpolation process by the digital filter 108, into the analog signal.

Figure 5:
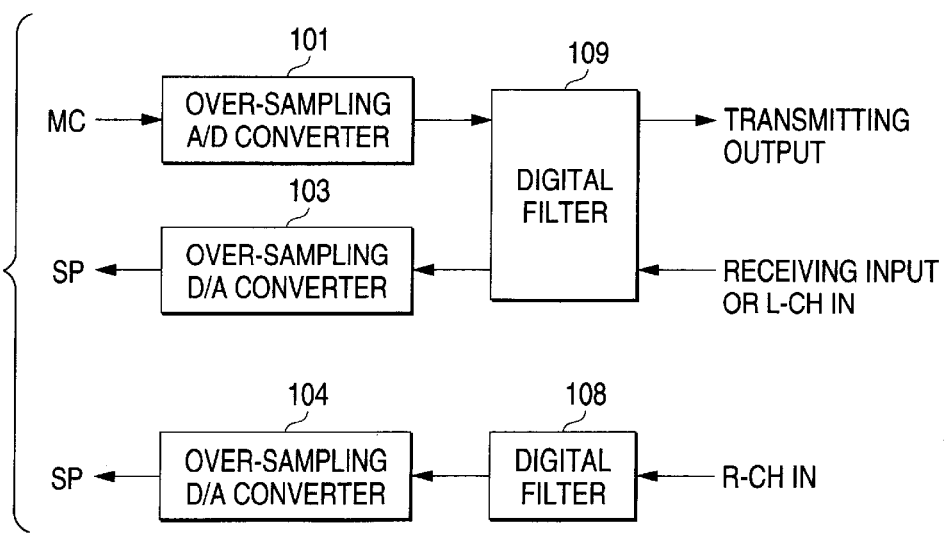
FIG. 5 is a block diagram showing a fourth embodiment of the present invention.

Following operations can be carried out by the configuration shown in FIG. 5.

1. To transmit/receive the telephone sound.
2. To playback the broadcasted audio sounds (L-ch, R-ch)
3. To playback the audio sounds (L-ch, R-ch) while transmitting the telephone sound.
4. To playback any one channel of the audio sounds (L-ch, R-ch) while transmitting/receiving the telephone sound.

The operation mode 1 can implement the telephone function for generating simultaneously the transmission/reception of the telephone sound by using the configuration shown in FIG. 5 as the PCM-CODEC.

The operation mode 2 can implement the music playback function for playing back the broadcasted audio sounds (L-ch, R-ch) via the loudspeaker or the headphone by using the configuration shown in FIG. 5 as the audio D/A converter.

The operation modes 3 and 4 use the configuration shown in FIG. 5 as the PCM-CODEC and the audio D/A converter. The operation mode 3 can playback the audio sounds (L-ch, R-ch) while transmitting the telephone sound. The operation mode 4 can playback one channel of the audio sounds (L-ch, R-ch) while transmitting/receiving the telephone sound.

The operation modes 1, 2 are limited to any one of the transmission/reception of the telephone sound and the music playback. In the normal use mode, the operation modes are effective in the case where the above operations are not needed simultaneously. The operation mode 3 can playback both channels of the audio sound, but it is limited to the transmission of the telephone sound. In this case, it may be considered that, while listening to the audio sound, the speech contents are stored in the memory device installed in the mobile communication terminal device or are transmitted.

Respective operation modes will be explained hereunder.

In the operation mode 1, at the time of transmission, the transmitting analog signal being output from the microphone is input into the A/D converter 101 and converted into the transmitting digital signal, and then input into one channel of the digital filter 109 to accept the decimation process, whereby the transmitting output can be obtained.

At the same time, the receiving input is input into one channel of the digital filter 109 to accept the interpolation process, then input into the D/A converter 103 and converted into the receiving analog signal, and then output as the receiving sound via the loudspeaker.

In the operation mode 1, since the D/A converter 104 and the digital filter 108 are not employed, the power-supply is cut off to suppress the power consumption.

In the operation mode 2, the L-ch audio digital signal is input into one channel of the digital filter 109 to accept the interpolation process, then input into the D/A converter 103 and converted into the L-ch audio analog signal, and then output via the loudspeaker. The R-ch audio digital signal is input into the digital filter 108 to accept the interpolation process, then input into the D/A converter 104 and converted into the R-ch audio analog signal, and then output via the loudspeaker. In this case, the audio analog signals maybe output via the headphone.

In the operation mode 2, the power-supply is cut off to suppress the power consumption since the A/D converter 101 is not employed. Also, since the digital filter 109 occupies only one channel, such digital filter 109 is operated at the half speed rather than the case where two channels are occupied on time-division basis.

The operation mode 3 operates the A/D converter 101 in addition to the operation in the operation mode 2. The transmitting analog signal being output from the microphone is input into the A/D converter 101 and converted into the transmitting digital signal, and then input into one channel of the digital filter 105 to accept the decimation process, whereby the transmitting output can be obtained.

The operation mode 4 operates the D/A converter 104 and the digital filter 108 in addition to the operation in the operation mode 1. The R-ch audio digital signal is input into the digital filter 108 to accept the interpolation process, then input into the D/A converter 104 and converted into the R-ch audio analog signal, and then output via the loudspeaker.

In this case, in respective operation modes, the audio digital signal may have the polarity opposite to the illustrated polarity.

According to the configuration shown in FIG. 5, since one of two digital filters in the configuration shown in FIG. 13 in the prior art can be composed of the 1-input/output filter, the time-division operation is not needed. Thus, there is no necessity to increase the operation speed, and thus the power consumption can be reduced. In addition, since three D/A converters can be unified into two converters by integrating two converters together, the circuit scale can be reduced and also the power consumption can be reduced.

In the illustrated example, the over-sampling type D/A converter 103 executes commonly operations of the receiving digital signal and the audio digital signal on one channel, but respective converters may be provided independently.

Also, the digital filter 109 shares a part of the hardware configuration and operates a part of it on time-division basis such that it can operate as the decimation filter and the interpolation filter. Therefore, the operation speed becomes twice the normal one. In contrast, the operation speed may be reduced to half by providing independently the decimation filter and the interpolation filter respectively not to operate the digital filter on time-division basis.

Fifth Embodiment

A fifth embodiment of the present invention will be explained with reference to FIG. 6 hereinafter.

The fifth embodiment comprises the over-sampling type A/D converter 101 for converting the transmitting analog signal output from the microphone into the transmitting digital signal; the 2-input/output type digital filter (first digital filter) 109, to one input of which the output of the A/D converter 101 is supplied and to the other input of which the receiving digital signal is supplied, for applying the decimation process to the output of the A/D converter 101 to send out to the outside and applying the interpolation process to the receiving digital signal, whereby the output of the A/D converter 101 and the receiving digital signal can be processed on time-division basis; the 2-input/output type digital filter (second digital filter) 110 to which the broadcasted L-ch and R-ch audio digital signals are supplied, for applying the interpolation process to the L-ch and R-ch audio digital signals on time-division basis; the multiplexer (selector) 111 for selecting any one of the receiving digital signal, which is subjected to the interpolation process by the digital filter 109, and the L-ch audio digital signal, which is subjected to the interpolation process by the digital filter 110; the over-sampling type D/A converter (first D/A converter) 103 for converting any one of the receiving digital signal, which is subjected to the interpolation process by the digital filter 109, and the L-ch audio digital signal, which is subjected to the interpolation process by the digital filter 110, into the analog signal in synchronism with the selecting operation of the multiplexer 111; and the over-sampling type D/A converter (second D/A converter) 104 for converting the R-ch audio digital signal, which is subjected to the interpolation process by the digital filter 110, into the analog signal.

Following operations can be carried out by the configuration shown in FIG. 6.

1. To transmit/receive the telephone sound.
2. To playback the broadcasted audio sounds (L-ch, R-ch).
3. To playback the audio sounds (L-ch, R-ch) while transmitting the telephone sound.
4. To playback any one channel of the audio sounds (L-ch, R-ch) while transmitting/receiving the telephone sound.

The operation mode 1 can implement the telephone function for generating simultaneously the transmission/reception of the telephone sound by using the configuration shown in FIG. 6 as the PCM-CODEC.

The operation mode 2 can implement the music playback function for playing back the broadcasted audio sounds (L-ch, R-ch) via the loudspeaker or the headphone by using the configuration shown in FIG. 6 as the audio D/A converter.

The operation modes 3 and 4 use the configuration shown in FIG. 6 as the PCM-CODEC and the audio D/A converter. The operation mode 3 can playback the audio sounds (L-ch, R-ch) while transmitting the telephone sound. The operation mode 4 can playback one channel of the audio sounds (L-ch, R-ch) while transmitting/receiving the telephone sound.

The operation modes 1, 2 are limited to any one of the transmission/reception of the telephone sound and the music playback. In the normal use mode, the operation modes are effective in the case where the above operations are not needed simultaneously. The operation mode 3 can playback both channels of the audio sound, but it is limited to the transmission of the telephone sound. In this case, it may be considered that, while listening to the audio sound, the transmitting contents are stored in the memory device installed in the mobile communication terminal device or are transmitted.

Respective operation modes will be explained hereunder.

In the operation mode 1, at the time of transmission, the transmitting analog signal being output from the microphone is input into the A/D converter 101 and converted into the transmitting digital signal, and then input into one channel of the digital filter 109 to accept the decimation process, whereby the transmitting output can be obtained.

At the same time, the receiving input is input into one channel of the digital filter 109 to accept the interpolation process, then input into the D/A converter 103 via the multiplexer 111 that selects the fixed terminal b and converted into the receiving analog signal, and then output via the loudspeaker.

In the operation mode 1, since the D/A converter 104 and the digital filter 110 are not employed, the power-supply is cut off to suppress the power consumption.

In the operation mode 2, the L-ch and R-ch audio digital signals are input into the digital filter 110 to accept the interpolation process respectively. The L-ch audio digital signal which is subjected to the interpolation process is input into the D/A converter 103 via the multiplexer 111 that selects the fixed terminal b and converted into the L-ch audio analog signal, and then output via the loudspeaker. The R-ch audio digital signal which is subjected to the interpolation process is input into the D/A converter 104 and converted into the R-ch audio analog signal, and then output via the loudspeaker. In this case, the L-ch and R-ch audio analog signals may be output via the headphone.

In the operation mode 2, the power-supply is cut off to suppress the power consumption since the A/D converter 101 and the digital filter 109 are not employed.

The operation mode 3 operates the A/D converter 101 and the digital filter 109 in addition to the operation in the operation mode 2. The transmitting analog signal being output from the microphone is input into the A/D converter 101 and converted into the transmitting digital signal, and then input into one channel of the digital filter 109 to accept the decimation process, whereby the transmitting output can be obtained.

In the operation mode 3, since the digital filter 109 occupies only one channel, such digital filter 109 is operated at the half speed rather than the case where two channels are occupied on time-division basis.

The operation mode 4 operates the D/A converter 104 and the digital filter 110 in addition to the operation in the operation mode 1. The R-ch audio digital signal is input into one channel of the digital filter 110 to accept the interpolation process, then input into the D/A converter 104 and converted into the R-ch audio analog signal, and then output via the loudspeaker.

In the operation mode 4, since the digital filter 109 occupies only one channel, such digital filter 109 is operated at the half speed rather than the case where two channels are occupied on time-division basis.

In this case, in respective operation modes, the audio digital signal may have the polarity opposite to the illustrated polarity.

According to the configuration shown in FIG. 6, three D/A converters in the configuration shown in FIG. 13 in the prior art can be unified into two converters by integrating two converters together. Therefore, the circuit scale can be reduced and also the power consumption can be reduced.

In the illustrated example, the D/A converter 103 executes commonly operations of the receiving digital signal and the audio digital signal on one channel, but respective converters may be provided independently.

Also, the digital filter 109 shares a part of the hardware configuration and operates a part of it on time-division basis such that it can operate as the decimation filter and the interpolation filter. Therefore, the operation speed becomes twice the normal one. In contrast, the operation speed may be reduced to half by providing independently the decimation filter and the interpolation filter respectively not to operate the digital filter on time-division basis. Furthermore, the digital filter 110 shares a part of the hardware configuration and operates a part of it on time-division basis such that it can operate as two sets of the interpolation filters. Therefore, the operation speed becomes twice the normal one. In contrast, the operation speed may be reduced to half by providing two sets of the interpolation filters independently not to operate the digital filter on time-division basis.

Sixth Embodiments

A sixth embodiment of the present invention will be explained with reference to FIG. 7 hereinafter.

The sixth embodiment comprises the over-sampling type A/D converter 101 for converting the transmitting analog signal output from the microphone into the transmitting digital signal;

the multiplexer (selector) 111 for selecting any one of the output of the A/D converter 101 and the receiving digital signal; the 1-input/output type digital filter (first digital filter) 105 to which the output of the multiplexer 111 is supplied, for applying the decimation process to the output of the A/D converter 101 to send out to the outside if the output of the multiplexer 111 is the output of the A/D converter 101, and for applying the interpolation process to the receiving digital signal if the output of the multiplexer 111 is the receiving digital signal; the 2-input/output type digital filter (second digital filter) 110 to which the L-ch and R-ch audio digital signals are supplied, for applying the interpolation process to the L-ch and R-ch audio digital signals on time-division basis; the over-sampling type D/A converter (first D/A converter) 102 for converting the receiving digital signal, which is subjected to the interpolation process by the digital filter 105, into the analog signal; the over-sampling type D/A converter (second D/A converter) 103 for converting the L-ch audio digital signal, which is subjected to the interpolation process by the digital filter 110, into the analog signal; and the over-sampling type D/A converter (third D/A converter) 104 for converting the R-ch audio digital signal, which is subjected to the interpolation process by the digital filter 110, into the analog signal.

Following operations can be carried out by the configuration shown in FIG. 7.

1. To playback the broadcasted audio sounds (L-ch, R-ch)
2. To playback the audio sounds (L-ch, R-ch) while transmitting the telephone sound.
3. To playback the audio sounds (L-ch, R-ch) while receiving the telephone sound.

The operation mode 1 can implement the music playback function for playing back the broadcasted audio sounds (L-ch, R-ch) via the loudspeaker or the headphone by using the configuration shown in FIG. 7 as the audio D/A converter.

The operation modes 2 and 3 use the configuration shown in FIG. 7 as the PCM-CODEC and the audio D/A converter. The operation mode 2 can playback the audio sounds (L-ch, R-ch) while transmitting the telephone sound. The operation mode 3 can playback the audio sounds (L-ch, R-ch) while receiving the telephone sound.

The operation modes 1, 2 are limited to any one of the transmission and the reception of the telephone sound. Such operation modes are effective in the mobile communication system of the simplex system such as the radio transceiver in which the transmission and the reception are not generated simultaneously.

In this case, it may be thought of as the operation mode 2 that, while listening to the audio sound, the transmitting contents are stored in the memory device installed in the mobile communication terminal device or are transmitted. Also, it may be thought of as the operation mode 3 that, while listening to the audio sound, the receiving contents are stored in the memory device installed in the mobile communication terminal device by a so-called automatic answering telephone function.

Respective operation modes will be explained hereunder.

In the operation mode 1, the L-ch and R-ch audio digital signals are input into the digital filter 110 to accept the interpolation process on time-division basis respectively, then input into the D/A converters 103, 104 and converted into the L-ch and R-ch audio analog signals, and then output via the loudspeaker. In this case, the L-ch and R-ch audio analog signals may be output via the headphone.

In the operation mode 1, the power-supply is cut off to suppress the power consumption since the A/D converter 101 and the digital filter 105 are not employed.

The operation mode 2 operates the A/D converter 101 and the digital filter 105 in addition to the operation in the operation mode 1. The transmitting analog signal being output from the microphone is input into the A/D converter 101 and converted into the transmitting digital signal, and then input into the digital filter 109 via the multiplexer 111 that selects the fixed terminal a to accept the decimation process, whereby the transmitting output can be obtained.

In the operation mode 2, the power-supply is cut off to suppress the power consumption since the A/D converter 102 is not employed.

The operation mode 3 operates the D/A converter 101 and the digital filter 105 in addition to the operation in the operation mode 1. The receiving input is input into the digital filter 105 via the multiplexer 111 that selects the fixed terminal b to accept the interpolation process, then input into the D/A converter 102 and converted into the receiving analog signal, and then output via the loudspeaker.

In the operation mode 3, the power-supply is cut off to suppress the power consumption since the A/D converter 101 is not employed.

In this case, in respective operation modes, the audio digital signal may have the polarity opposite to the illustrated polarity.

According to the configuration shown in FIG. 7, since one of two digital filters in the configuration shown in FIG. 13 in the prior art can be composed of the 1-input/output filter, the time-division operation is not needed. As a result, there is no necessity to increase the operation speed, and thus the power consumption can be reduced.

Seventh Embodiment

A seventh embodiment of the present invention (corresponding to claim 7) will be explained with reference to FIG. 8 hereinafter.

The seventh embodiment comprises the over-sampling type A/D converter 101 for converting the transmitting analog signal output from the microphone into the transmitting digital signal; the multiplexer (selector) 111 for selecting anyone of the output of the A/D converter 101 and the receiving digital signal; the 2-input/output type digital filter (first digital filter) 109, to one input of which the output of the multiplexer 111 is supplied and to the other input of which the broadcasted L-ch audio digital signal is supplied, for applying the decimation process to the output of the A/D converter 101 to send out to the outside if the output of the multiplexer 111 is the output of the A/D converter 101, and for applying the interpolation process to the receiving digital signal and applying the interpolation process to the L-ch audio digital signal if the output of the multiplexer 111 is the receiving digital signal, whereby the output of the multiplexer 111 and the L-ch audio digital signal can be processed on time-division basis; the 1-input/output type digital filter (second digital filter) 108 for applying the interpolation process to the R-ch audio digital signal; the over-sampling type D/A converter (first D/A converter) 102 for converting the receiving digital signal, which is subjected to the interpolation process by the digital filter 109, into the analog signal; the over-sampling type D/A converter (second D/A converter) 103 for converting the L-ch audio digital signal, which is subjected to the interpolation process by the digital filter 109, into the analog signal; and the over-sampling type D/A converter (third D/A converter) 104 for converting the R-ch audio digital signal, which is subjected to the interpolation process by the digital filter 108, into the analog signal.

Figure 8:
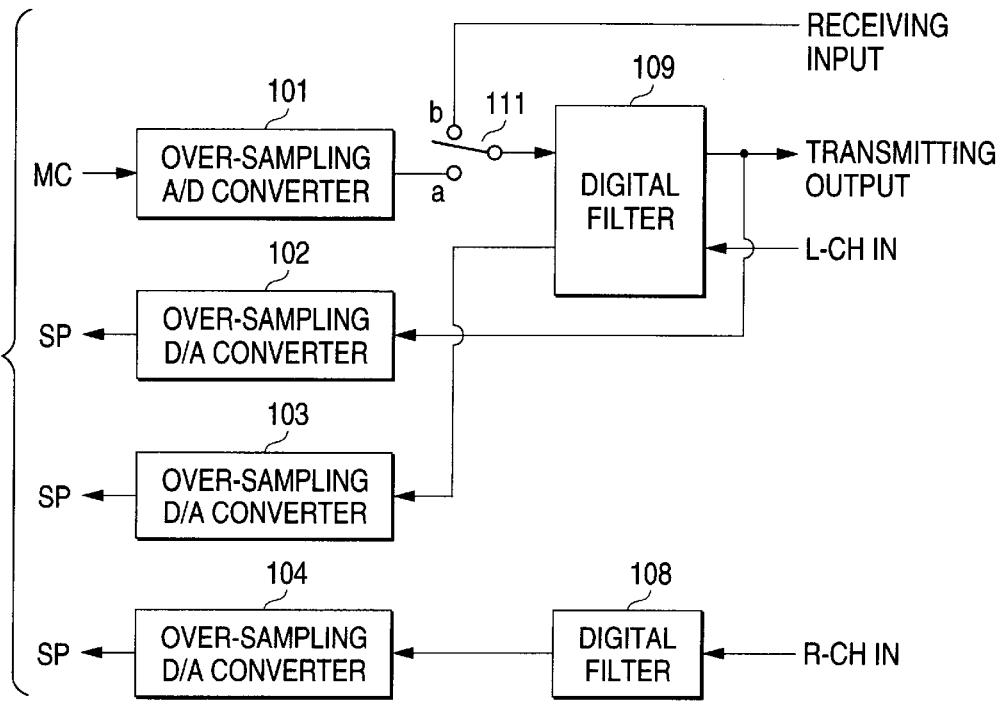
FIG. 8 is a block diagram showing a seventh embodiment of the present invention.
Figure 9:
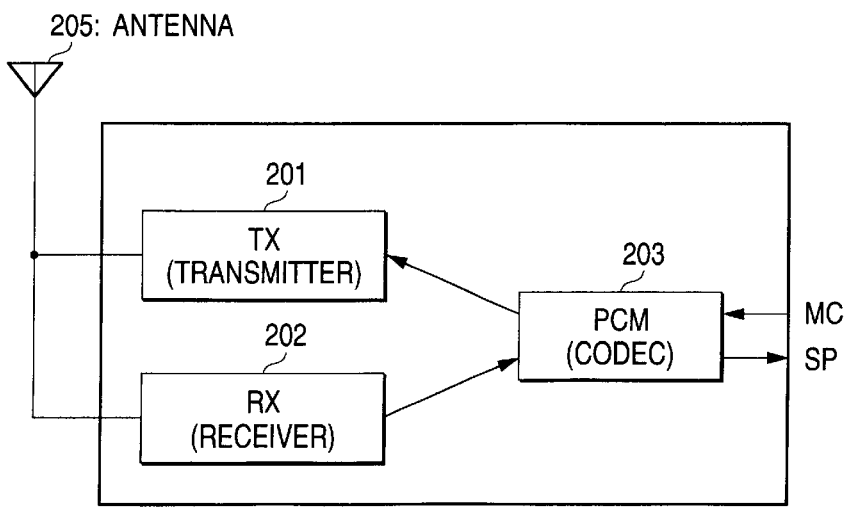
FIG. 9 is a block diagram showing a configuration of the existing mobile communication terminal device.
Figure 10:
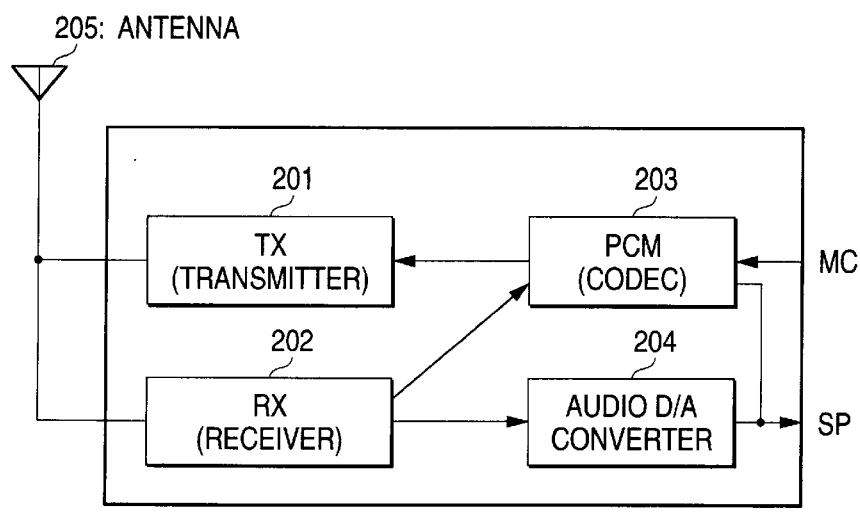
FIG. 10 is a block diagram showing a configuration of the mobile communication terminal device to meet the music broadcasting service.
Figure 11:
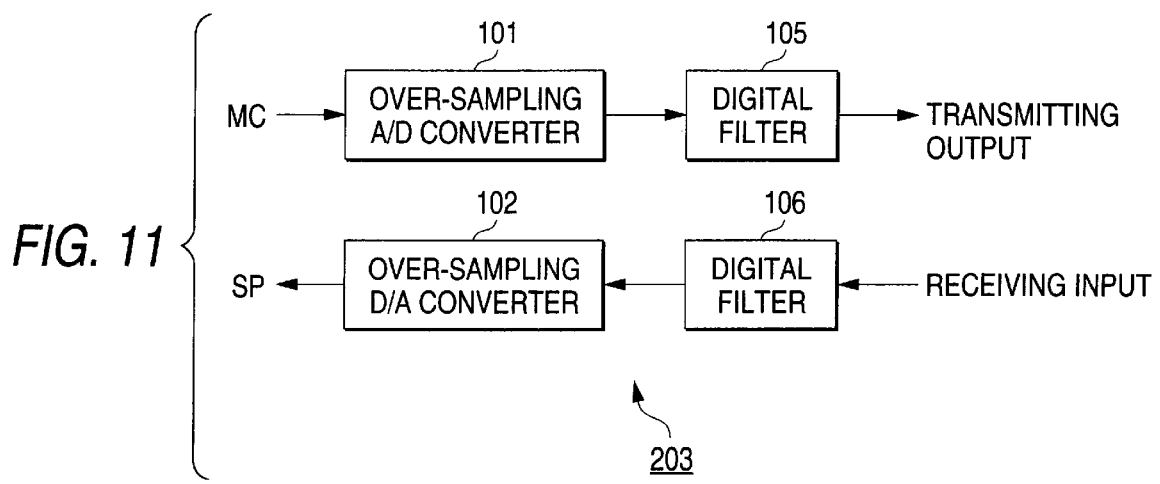
FIG. 11 is a block diagram showing a configuration of a PCM-CODEC 203 shown in FIG. 9 and FIG. 10.
Figure 12:
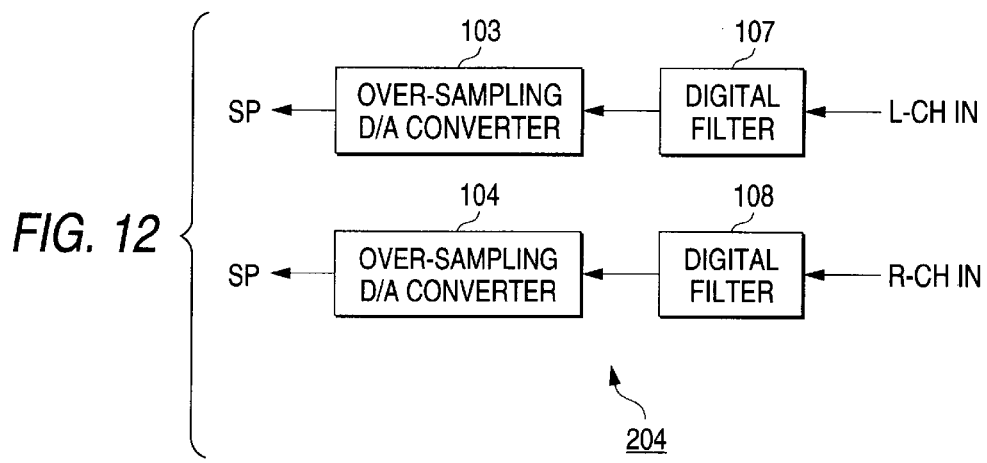
FIG. 12 is a block diagram showing a configuration of an audio D/A converter 204.

Following operations can be carried out by the configuration shown in FIG. 8.

1. To playback the broadcasted audio sounds (L-ch, R-ch)
2. To playback the audio sounds (L-ch, R-ch) while transmitting the telephone sound.
3. To playback the audio sounds (L-ch, R-ch) while receiving the telephone sound.

The operation mode 1 can implement the music playback function for playing back the broadcasted audio sounds (L-ch, R-ch) via the loudspeaker or the headphone by using the configuration shown in FIG. 8 as the audio D/A converter.

The operation modes 2 and 3 use the configuration shown in FIG. 8 as the PCM-CODEC and the audio D/A converter. The operation mode 2 can playback the audio sounds (L-ch, R-ch) while transmitting the telephone sound. The operation mode 3 can playback the audio sounds (L-ch, R-ch) while receiving the telephone sound.

The operation modes 2, 3 are limited to any one of the transmission and the reception of the telephone sound. Such operation modes are effective in mobile communication system of the simplex system such as the radio transceiver in which the transmission and the reception are not generated simultaneously.

In this case, it may be thought of as the operation mode 2 that, while listening to the audio sound, the transmitting contents are stored in the memory device installed in the mobile communication terminal device or are transmitted. Also, it may be thought of as the operation mode 3 that, while listening to the audio sound, the receiving contents are stored in the memory device installed in the mobile communication terminal device by the so-called automatic answering telephone function.

Respective operation modes will be explained hereunder.

In the operation mode 1, the L-ch audio digital signal is input into one channel of the digital filter 110 to accept the interpolation process, then input into the D/A converter 103 and converted into the L-ch audio analog signal, and then output via the loudspeaker. The R-ch audio digital signal is input into one channel of the digital filter 108 to accept the interpolation process, then input into the D/A converter 104 and converted into the R-ch audio analog signal, and then output via the loudspeaker. In this case, the L-ch and R-ch audio analog signals may be output via the headphone respectively.

In the operation mode 1, the power-supply is cut off to suppress the power consumption since the A/D converter 101 and the D/A converter 102 are not employed. Also, since the digital filter 109 occupies only one channel, such digital filter 109 is operated at the half speed rather than the case where two channels are occupied on time-division basis.

The operation mode 2 operates the A/D converter 101 in addition to the operation in the operation mode 1. The transmitting analog signal being output from the microphone is input into the A/D converter 101 and converted into the transmitting digital signal, and then input into one channel of the digital filter 109 via the multiplexer 111 that selects the fixed terminal a to accept the decimation process, whereby the transmitting output can be obtained.

In the operation mode 2, the power-supply is cut off to suppress the power consumption since the A/D converter 102 is not employed.

The operation mode 3 operates the A/D converter 102 in addition to the operation in the operation mode 1. The receiving input is input into one channel of the digital filter 109 via the multiplexer 111 that selects the fixed terminal b to accept the interpolation process, then input into the D/A converter 102 and converted into the receiving analog signal, and then output via the loudspeaker.

In the operation mode 3, the power-supply is cut off to suppress the power consumption since the A/D converter 101 is not employed.

In this case, in respective operation modes, the audio digital signal may have the polarity opposite to the illustrated polarity.

According to the configuration shown in FIG. 8, since one of two digital filters in the configuration shown in FIG. 13 in the prior art can be composed of the 1-input/output filter, the time-division operation is not needed. As a result, there is no necessity to increase the operation speed, and thus the power consumption can be reduced.

As described above, according to the present invention, in the mobile communication terminal device that can meet new services such as music broadcasting, etc. in addition to the transmission/reception of the telephone sound, since the digital filters and the D/A converters that are provided commonly in the PCM-CODEC and the audio D/A converters are shared according to the function and the application and also the operation speed is compensated by the time-division operation, the circuit scale can be reduced and the power consumption can be reduced.

What is claimed is:

1. A mobile communication terminal device comprising:
   an A/D converter for converting a transmitting analog signal into a transmitting digital signal;
   a first selector for selecting one of an output of the A/D converter and one channel of broadcasted audio digital signals;
   a second selector for selecting one of a receiving digital signal and the other channel of the audio digital signals;
   a digital filter, to one input of which a first output of the first selector is supplied and to the other input of which a second output of the second selector is supplied, for applying a decimation process to the first output to send out to an outside if the first output is an output of the A/D converter, and for applying an interpolation process to the first output and applying the interpolation process to the second output if the first output is one channel of the audio digital signals, whereby the first output and the second output is processed on time-division basis;
   a first D/A converter for converting one channel of the audio digital signals, which is subjected to the interpolation process by the digital filter, into an analog signal; and
   a second D/A converter for converting one of the other channel of the audio digital signals and the receiving digital signal, which are subjected to the interpolation process by the digital filter, into the analog signal in synchronism with a selecting operation of the second selector.

2. A mobile communication terminal device comprising:
   an A/D converter for converting a transmitting analog signal into a transmitting digital signal;
   a digital filter, to one input of which an output of the A/D converter is supplied and to the other input of which a receiving digital signal is supplied, for applying a decimation process to the output of the A/D converter to send out to an outside, and applying an interpolation process to the receiving digital signal, whereby the output of the A/D converter and the receiving digital signal can be processed on time-division basis;
   a selector for selecting one of the receiving digital signal, which is subjected to the interpolation process by the digital filter, and one channel of broadcasted audio digital signals;
   a first D/A converter for converting one of the receiving digital signal, which is subjected to the interpolation process by the digital filter, and one channel of the audio digital signals into an analog signal in synchronism with a selecting operation of the selector; and
   a second D/A converter for converting the other channel of the audio digital signals into the analog signal.

3. A mobile communication terminal device comprising:
   an A/D converter for converting a transmitting analog signal into a transmitting digital signal;
   a first digital filter, to one input of which an output of the A/D converter is supplied and to the other input of which a receiving digital signal is supplied, for applying a decimation process to the output of the A/D converter to send out to an outside and applying an interpolation process to the receiving digital signal, whereby the output of the A/D converter and the receiving digital signal can be processed on time-division basis;
   a second digital filter to which both channels of broadcasted audio digital signals are supplied, for applying the interpolation process to both channels of the audio digital signals on time-division basis;
   a selector for selecting any one of the receiving digital signal, which is subjected to the interpolation process by the first digital filter, and one channel of the audio digital signals, which is subjected to the interpolation process by the second digital filter;
   a first D/A converter for converting any one of the receiving digital signal, which is subjected to the interpolation process by the first digital filter, and one channel of the audio digital signals, which is subjected to the interpolation process by the second digital filter, into an analog signal in synchronism with a selecting operation of the selector; and
   a second D/A converter for converting the other channel of the audio digital signals, which is subjected to the interpolation process by the second digital filter, into the analog signal.

4. A mobile communication terminal device comprising:
   an A/D converter for converting a transmitting analog signal into a transmitting digital signal;
   a selector for selecting any one of an output of the A/D converter and a receiving digital signal;
   a first digital filter to which an output of the selector is supplied, for applying a decimation process to the output of the A/D converter to send out to an outside if the output of the selector is an output of the A/D converter, and for applying an interpolation process to the receiving digital signal if the output of the selector is the receiving digital signal;
   a second digital filter to which both channels of audio digital signals are supplied, for applying the interpolation process to both channels of the audio digital signals on time-division basis;

a first D/A converter for converting the receiving digital signal, which is subjected to the interpolation process by the first digital filter, into an analog signal;

a second D/A converter for converting one channel of the audio digital signals, which is subjected to the interpolation process by the second digital filter, into the analog signal; and a third D/A converter for converting the other channel of the audio digital signals, which is subjected to the interpolation process by the second digital filter, into the analog signal.

5. A mobile communication terminal device comprising:

an A/D converter for converting a transmitting analog signal into a transmitting digital signal;

a selector for selecting any one of an output of the A/D converter and a receiving digital signal;

a first digital filter, to one input of which an output of the selector is supplied and to the other input of which one channel of broadcasted audio digital signals is supplied, for applying a decimation process to the output of the A/D converter to send out to an outside if the output of the selector is the output of the A/D converter, and for applying an interpolation process to the receiving digital signal and applying the interpolation process to one channel of the audio digital signals if the output of the selector is the receiving digital signal, whereby the output of the selector and one channel of the audio digital signals can be processed on time-division basis;

a second digital filter for applying the interpolation process to the other channel of the audio digital signals;

a first D/A converter for converting the receiving digital signal, which is subjected to the interpolation process by the first digital filter, into an analog signal;

a second D/A converter for converting one channel of the audio digital signals, which is subjected to the interpolation process by the first digital filter, into the analog signal; and a third D/A converter for converting the other channel of the audio digital signals, which is subjected to the interpolation process by the second digital filter, into the analog signal.

* * * * *